United States Patent [19]
Herbst et al.

[11] 4,367,534
[45] Jan. 4, 1983

[54] CIRCUIT FOR SENSOR-CONTROLLED TELEMETRY

[75] Inventors: Heiner Herbst, Munich; Hans-Joerg Pfleiderer, Zorneding; Hans-Peter Grassl, Munich, all of Fed. Rep. of Germany

[73] Assignee: Siemens Aktiengesellschaft, Berlin & Munich, Fed. Rep. of Germany

[21] Appl. No.: 172,075

[22] Filed: Jul. 24, 1980

[30] Foreign Application Priority Data

Sep. 10, 1979 [DE] Fed. Rep. of Germany ....... 2936520

[51] Int. Cl.³ .................... G01C 3/32; G01C 3/08; G06F 15/336
[52] U.S. Cl. ................................. 364/561; 250/201; 354/25
[58] Field of Search ............... 364/561, 604, 728, 822; 354/25 P, 25 R; 250/201

[56] References Cited

U.S. PATENT DOCUMENTS

| | | | |
|---|---|---|---|
| 4,135,815 | 1/1979 | Masunaga et al. | 354/25 P X |
| 4,162,533 | 7/1979 | Ricci | 364/728 |
| 4,189,232 | 2/1980 | Asano et al. | 354/25 X |
| 4,247,761 | 1/1981 | Stein | 354/25 |
| 4,247,762 | 1/1981 | Wilwerding | 354/25 P X |
| 4,255,795 | 3/1981 | Hechtenberg | 364/604 X |

FOREIGN PATENT DOCUMENTS 2030417 4/1980 United Kingdom ................. 354/25

OTHER PUBLICATIONS

Honeywell's Automatic Focus Chip Attracts a Host of Camera Makers, Electronics, Nov. 10, 1977, pp. 40, 42, 44.

*Primary Examiner*—Felix D. Gruber
*Attorney, Agent, or Firm*—Hill, Van Santen, Steadman, Chiara & Simpson

[57] ABSTRACT

A circuit for sensor-controlled telemetry has two linear image sensors each having a number of opto-electronic sensor elements on which are projected sections of corresponding lines of two separately-obtained images from an object whose range is to be determined and has a single-input evaluator post connected to each sensor element through switching transistors, which evaluators are switchable between two logic states dependent upon whether a voltage generated by accumulated charge in a sensor element is above or below a reference potential. The digitalized signals from each evaluator are serially transmitted through respective associated shift registers to a logic circuit which compares the contents of stages of shift registers for each image sensor for determining coincidence of the digital signals. The number of coincidences indicate the relative position correlation of the images on the image sensors and this number of coincidences is serially transmitted to another shift register to a counter for determination of a maximum correlation and subsequent generation of an operational range-indicating or range-finding signal.

10 Claims, 8 Drawing Figures

CIRCUIT FOR SENSOR-CONTROLLED TELEMETRY

BACKGROUND OF THE INVENTION

The present invention relates to circuits for sensor-controlled telemetry, and in particular to such circuits integrated on a semiconductor substrate which determine a maximum correlation of imagings on two separate image sensors.

A circuit for sensor-controlled telemetry utilizing sensor elements which transmit voltages corresponding to charge accumulation to a number of associated evaluators is known from the German patent application No. P 28 38 647.2. The evaluators utilized therein effect a digitalization of the received sensor signals and are portions of individual stages of a shift register associated with each image sensor which generate relative position shifts of the sensor signals in the longitudinal direction of the image sensors.

Because the evaluator circuits in the above-described circuit form portions of the stages of a shift register, the evaluator circuits are subject to the overall shift register manufacturing tolerances and as a result are limited in precision of operation by the specifications of the shift register.

SUMMARY OF THE INVENTION

It is an object of the present invention to provide a circuit for sensor-controlled telemetry utilizing evaluators which are post-connected to a number of sensor elements in a pair of image sensors which renders a precise digitalization of the sensor signals and a correspondingly precise analysis of the maximum correlation of the sensor signals from each image sensor.

The above object is inventively achieved by separating the evaluator circuitry from the shift register circuitry by a number of switching transistors interconnected between stages of a shift register associated with each image sensor and the evaluators associated with the corresponding sensor elements. When the switching transistors are in a blocking state, the evaluator circuits are completely separated from the stages of the shift register so that independently of the characteristic parameters of the individual circuit parts of the shift register, the evaluator circuits can be reset to specified voltage values which may be made as precise as necessary at the commencement of integration times for the sensor elements at one or more circuit points.

The evaluators each compare voltage values, emitted by the sensor elements which are determined by the amount of charge collected in the individual opto-electronic sensor elements during an integration time, with a reference voltage and emit a digital logic signal according to whether the voltage value is above or below the reference voltage. The output of each evaluator is transmitted through a switching transistor to one stage of a pair of shift registers respectively allocated to each image sensor. The outputs of the shift registers are transmitted through further switching transistors to a logic circuit which compares the values of each stage of the two shift registers to determine coincidence of the logic values which thereby indicates the relative position shift of the separately-obtained images on each image sensor. The logic circuit transmits a further digital output to another shift register which serially transmits the data to a counter which counts the number of coincidences and thereby determines the maximum correlation occurring during a readout cycle. The counter is part of a further processing stage which transmits range-finder information corresponding to the correlation to an output device which may be a visual display or a device for automatically setting the distance of a focusing lens from an image plane.

The inventive concept disclosed herein may be utilized in any range-finding application, such as in a photographic or electronic camera.

DESCRIPTION OF THE PREFERRED EMBODIMENTS

Figure 1:
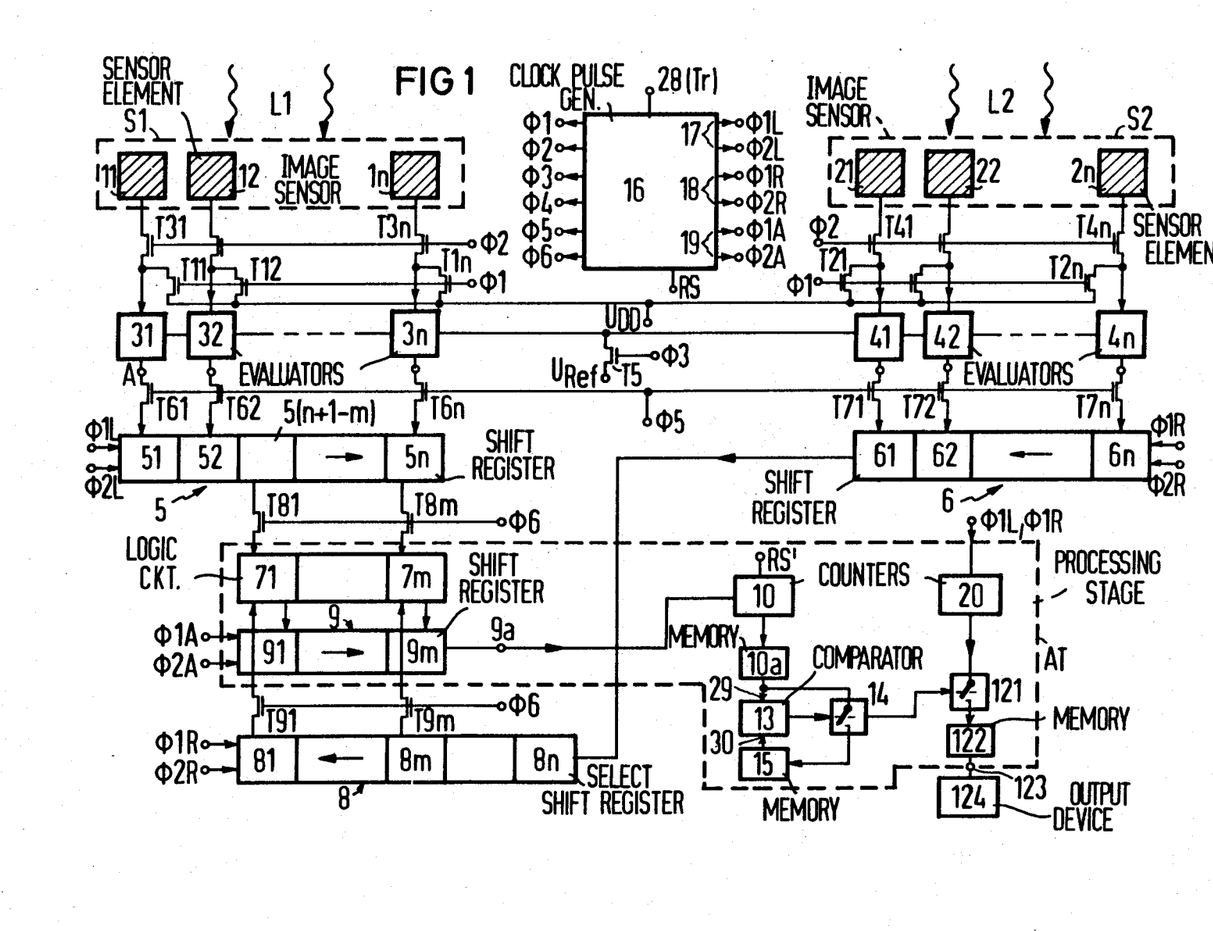
FIG. 1 is a schematic circuit diagram of a circuit for sensor-controlled telemetry constructed in accordance with the principles of the present invention.

A circuit for sensor controlled telemetry is schematically illustrated in FIG. 1 which has two linear image sensors S1 and S2. The sensor S1 has a plurality of opto-electronic sensor elements 11, 12, ... 1n and the sensor S2 has a like number of opto-electronic sensor elements 21, 22, ... 2n. The image sensors S1 and S2 are integrated on a doped semiconductor body of a first conductivity type. If the sensor elements are photodiodes, the shaded areas shown in FIG. 1 represent the areas of a second conductivity type opposite to that of the semiconductor body, which areas are arranged at the boundary surface of the semiconductor body. Radiation L1 is incident on the image sensor S1 and radiation L2 is incident on the image sensor S2.

The sensor elements 11 through 1n are respectively connected to individually allocated switching transistors T11, T12 ... T1n and T31 ... T3n to a terminal connected to a constant voltage $U_{DD}$. Similarly, the sensor elements 21 through 2n are respectively connected through individually allocated switching transistors T21 through T2n and T41 through T4n to the constant voltage $U_{DD}$. The gate electrodes of the switching transistors T11 through T1n and T21 through T2n are respectively connected to a common terminal to which a clock pulse voltage $\phi_1$ is supplied, and the gate electrodes of the switching transistors T31 through T3n and T41 through T4n are respectively connected to a common terminal to which a clock pulse voltage $\phi_2$ is supplied.

A plurality of evaluators 31, 32 ... 3n are respectively connected to the sensor elements of the image sensor S1 through the switching transistors T31 through T3n.

Similarly, evaluators 41, 42 ... 4n are connected via switching transistors T41 through T4n to the individual sensor elements of the image sensor S2. Each evaluator has an output A. Each evaluator is connected to a reference voltage $U_{Ref}$ via a switching transistor T5 which has a gate controlled by a clock pulse voltage $\phi 3$.

Figure 2:
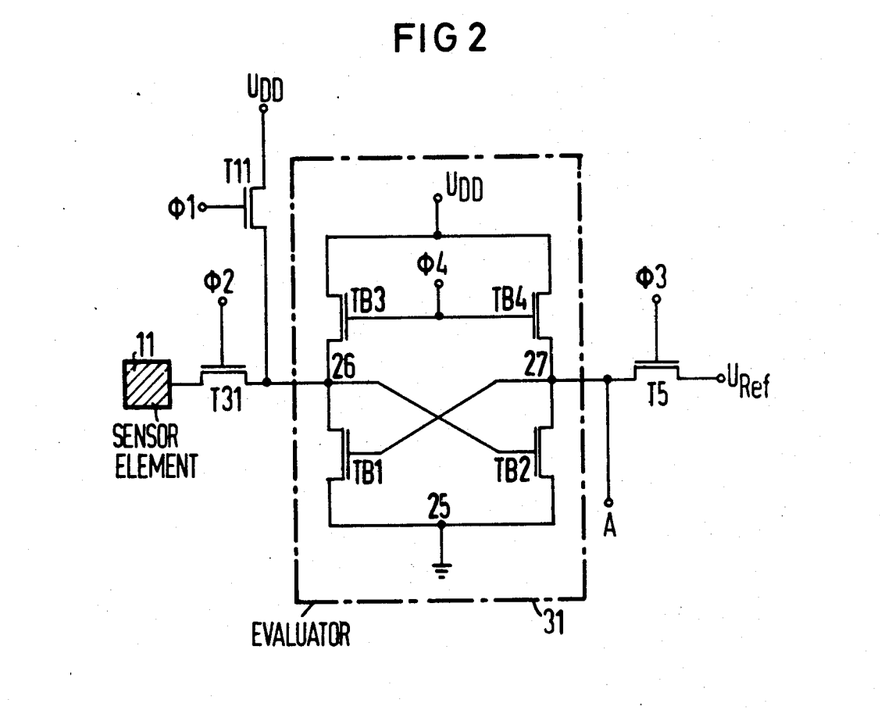
FIG. 2 is a detailed circuit for one of the evaluators shown in FIG. 1.

A circuit which may serve for any of the evaluators shown in FIG. 1 is illustrated in FIG. 2 with respect to the particular evaluator 31. Components external to the evaluator 31 and associated therewith already described in connection with FIG. 1 bear identical reference numerals in FIG. 2. The evaluator 31 is a flip-flop circuit having switching transistors TB1 and TB2 and transistors TB3 and TB4 operating as switchable load elements. The source terminals of transistors TB1 and TB2 are connected via a common terminal 25 to the reference potential of the circuit while the drain terminals of the transistors TB3 and TB4 are connected via a common terminal to the constant voltage $U_{DD}$. The single input node for the evaluator 31 is referenced at 26 and the output node is referenced at 27. A cross-coupling exists between the gate electrodes of the transistors TB1 and TB2 and the junctions 27 and 26. The gate electrodes of the transistors TB3 and TB4 are connected via a common terminal with a clock pulse voltage $\phi 4$. A detailed description of the operation of the circuit of FIG. 2 will follow below in connection with further description of FIG. 1.

The outputs A of each evaluator associated with the image sensor S1 are connected via switching transistors T61, T62 ... T6n to the respective individual stages 51, 52 ... 5n of a shift register 5 allocated to the image sensor S1. Similarly, the outputs A of the evaluators 41 through 4n are connected via switching transistors T71 through T7n to the respective individual stages 61, 62 ... 6n of a shift register 6 allocated to the image sensor S2. The transistors T61 through T6n and T71 through T7n are connected at their respective gates to a common terminal supplied with a clock pulse voltage $\phi 5$. As will be more fully described below, the evaluators may assume one of two possible switching states at the output A corresponding to a logic level 1 or 0. For the purposes of the following discussion, the signals occurring at the outputs A of the evaluators associated with the image sensor S1 will be respectively designated S11 ... S1n and the outputs of the evaluators associated with the image sensor S2 will be respectively designated S21 ... S2n.

The shift register 5 is supplied with clock pulse voltages $\phi 1L$ and $\phi 2L$ and the shift register 6 is supplied with clock pulse voltages $\phi 1R$ and $\phi 2R$. Each shift register is preferably a two-phase dynamic shift register.

The outputs of the last m stages of the shift register 5, beginning with the stage 5(n+1−m) are conducted to first inputs of a group of logic circuit analyzers 71 through 7m via switching transistors T81 ... T8m, each connected at a gate electrode to a common terminal supplied with a clock pulse voltage $\phi 6$. The output of the stage 61 of the shift register 6 is connected with the input of a stage 8n of a select shift register 8 having stages 81 ... 8m ... 8n. The shift register 8 is supplied with clock pulse voltages $\phi 1R$ and $\phi 2R$. Outputs of the stages 81 through 8m of the shift register 8 are connected to a second input of the group of logic analyzers 71 through 7m via switching transistors T91 ... T9m, each having a gate electrode connected to a common terminal supplied with the clock voltage $\phi 6$.

The outputs of each analyzer in the group of analyzers 71 through 7m are respectively connected to the individual stages 91 ... 9m of a shift register 9 which has an output 9a. The shift register 9 is supplied with clock pulse voltages $\phi 1A$ and $\phi 2A$.

The logic analyzers 71 ... 7m and the shift register 9 form a part of a larger processing stage AT which also includes a counter 10 post-connected to the shift register 9 at the output 9a. The output of the counter 10 is connected to a first memory 10a which has an output connected through an electronic switch 14 to a second memory 15 as well as to a first input 29 of a digital comparator 13. The output of the second memory 15 is connected to the digital comparator 13 at a second input 30 thereof. The digital comparator 13 supplies a control signal to the electronic switch 14. The processing stage AT further includes a second counter 20 supplied with a clock pulse derived from either the clock pulse $\phi 1L$ or $\phi 1R$ which has an output connected to a second electronic switch 121 which is also controlled by the digital comparator 13. The electronic switch 21 connects the second counter 20 to a third memory 122 which has an output 123 which forms the output of the processing stage AT. Operational signals for range-finding from the processing stage AT are transmitted to an output device 124 connected to the output 123 which is more fully described below.

A clock pulse generator 16 supplies the necessary clock pulse voltages for operating the circuit described herein and has outputs for clock pulse voltages $\phi 1$ through $\phi 6$ as well as an output pair 17 for $\phi 1L$ and $\phi 2L$, an output pair 18 for $\phi 1R$ and $\phi 2R$, and an output pair 19 for $\phi 1A$ and $\phi 2A$. The clock pulse generator is set into operation at a beginning of a readout cycle by a trigger pulse Tr supplied to an input 28 thereof by suitable control circuitry not a part of the invention herein.

The principle of telemetry or range finding utilized by the circuit disclosed herein is based on the fact that two separate imagings of an object are gained by two optical systems whose range-dependent relative positions are then evaluated. The radiation in the form of light rays L1 proceed from the object whose range is to be determined and, via a first optical system, project an imaging of the object on the plane of the image sensor S1 in such a manner that the image sensor S1 is aligned to a line section of the imaging. The radiation in the form of light rays L2, which are gained via a second optical system from the object, project a second imaging of the object onto the plane of the image sensor S2 in an analogous manner, namely, such that the image sensor S2 is directed to the same line section when the object is situated at a predetermined distance which may, for example, be infinity. If the distance of the object changes with respect to the predetermined value, the line sections projected onto the image sensors S1 and S2 are accordingly displaced in the longitudinal direction of the image sensors. The size of the mutual displacement thereby represents a measure of the actual range of the object. A similar method of telemetry in which the relative displacements of two imagings of the objects are utilized, but in which planar arrangements of photodiodes are provided instead of linear image sensors is generally described, for example, in the periodical "Electronics" Nov. 10, 1977 at pages 40, 42, 44.

Figure 3:
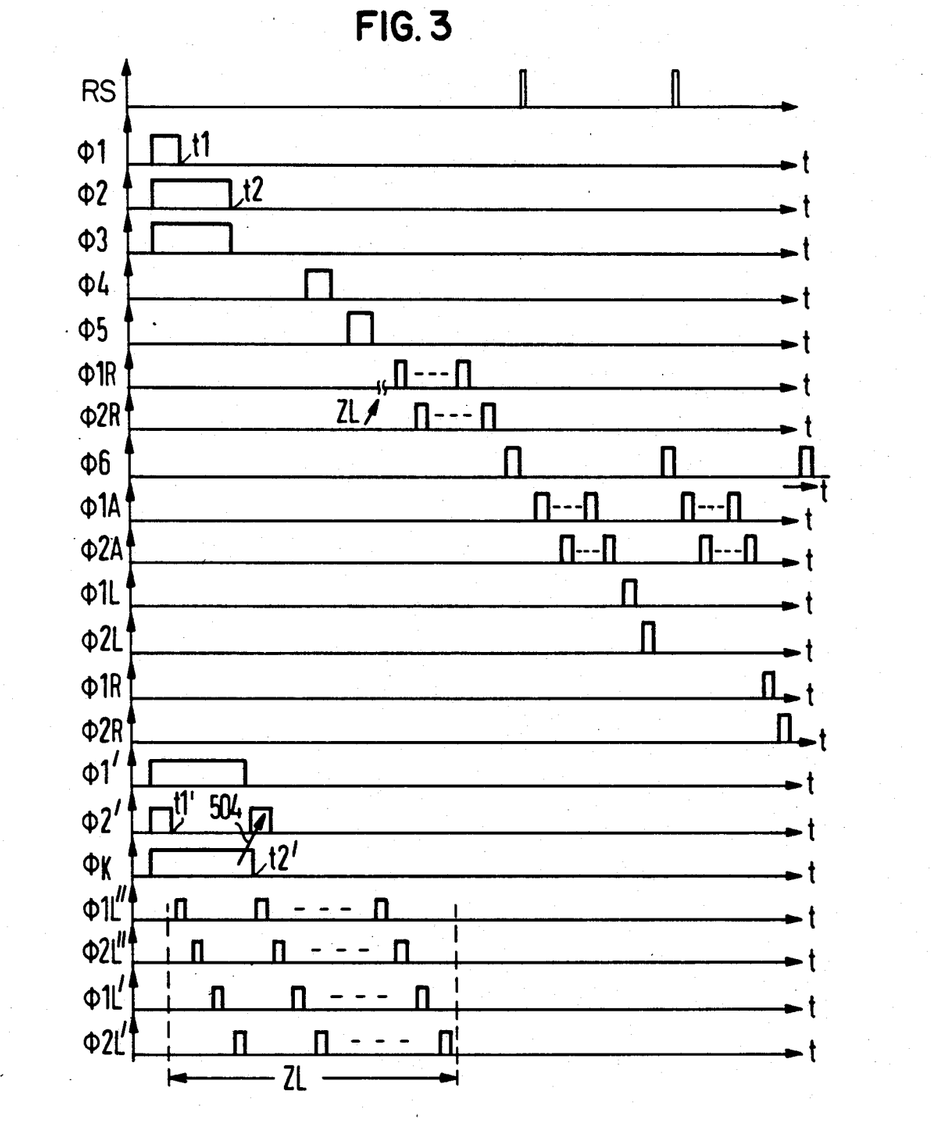
FIG. 3 is a voltage/time diagram for the clock pulse voltages for operating the circuits of FIGS. 1 and 2.

The specific manner of functioning of the circuit shown in FIGS. 1 and 2 will now be described in combination with the voltage/time diagrams shown in FIG. 3. Upon the occurrence of a trigger pulse Tr at the input 28 of the clock pulse generator 16, the generator 16 emits clock pulses $\phi1$ and $\phi2$. The sensor elements, such as, for example sensor element 11, and the input nodes of the associated evaluator, such as for example node 26, are thereby reset to the constant voltage $U_{DD}$. A simultaneously-beginning clock pulse $\phi3$ switches the transistor T5 into a conductive state so that the output node 27 is connected to the reference voltage $U_{Ref}$. Upon termination of the clock pulse $\phi1$ at a time t1, charge carriers respectively generated by the incident radiation L1 and L2 begin to collect in the sensor elements in each image sensor resulting in a voltage drop for each sensor element corresponding to the amount of collected charge. The potential at the allocated input nodes of each evaluator, for example node 26, is reduced in an amount proportional to the amount of optically generated charges respectively collected in the sensor elements. That is, the potential drop will increase with increased charge carrier generation. The time span between the end of the clock pulse $\phi1$ at the time t1 and the end of the clock pulse $\phi2$ at a time t2 is designated as the integration time. Optically generated charges are collected in the sensor elements only during the integration time.

After termination of the pulses $\phi2$, and $\phi3$ a clock pulse $\phi4$ supplied by a further output of the generator 16 is applied to the gate electrodes of the transistors TB3 and TB4, and to corresponding transistors in each other evaluator, so that the flip-flop circuit of each evaluator is activated.

For the case in which a potential drop occurred at the node 26 such that the potential at the node 26 fell below the reference voltage $U_{Ref}$, a voltage occurs at the node 27 which approximately corresponds to the constant voltage $U_{DD}$ (a logical 1). If on the other hand, the potential at the node 26 did not fall below the reference voltage $U_{Ref}$ the node 27 is at a potential approximately corresponding to the reference potential at the terminal 25 (a logical 0). Thus, each evaluator emits a digitalized sensor signal, for example S11, having a value dependent upon the attainment or non-attainment of a reference charge in the individual sensor elements which is present precisely when the potential at the node 26 at the time t2 equals the reference voltage $U_{Ref}$.

Upon the occurrence of a further clock pulse $\phi5$, the digitalized sensor signals from each evaluator are supplied to the respective inputs of allocated stages 51 through 5n of the shift register 5 and stages 61 through 6n of the shift register 6.

The clock pulse generator 16 subsequently supplies clock pulse voltages $\phi1R$ and $\phi2R$ which shift the digitalized sensor signals contained in the shift register stages 61 through 6n into the stages 81 through 8n of the shift register 8. Upon the occurrence of a clock pulse $\phi6$, the sensor signals contained in the last m stages of the shift register 5 and the sensor signals contained in the stages 81 through 8m of the shift register 8 are transmitted to respective first and second inputs of the logic analyzers 71 through 7m. Each of these analyzers is designed to transmit a first logic output signal upon the simultaneous connection thereto of two logic 1 signals or the simultaneous connection of two logic 0 signals. Non-coincident signals supplied to the analyzers result in an output signal of a second logic type. Each analyzer 71 through 7m may be designed as an exclusive OR gate.

The logic output signals of the analyzers 71 through 7m are transmitted into the stages 91 through 9m of the readout shift register 9 and upon the subsequent connection of clock pulse trains $\phi1A$ and $\phi2A$ thereto a serial readout of the logic output signals of the analyzers 7m through 71 takes place. Those logic output signals which show a coincidence between the sensor signal pairs connected to the analyzer inputs are counted in the counter 10. The counter 10 transmits a digital signal corresponding to the count result via the memory 10a to the input 29 of the digital comparator 13.

There follows a shift of all sensor signals stored in the shift register 5 by one stage to the right, which is brought about by the clock pulse pair $\phi1L$ and $\phi2L$ emitted by the clock pulse generator 16. As a consequence, the allocation of the sensor signals input into the logic analyzers 71 through 7m correspondingly changes upon the occurrence of a further pulse $\phi6$. A new readout operation follows in the shift register 9 which is triggered by additional clock pulse trains $\phi1A$ and $\phi2A$. The counter 10, which was previously reset to 0 by applying a reset pulse from a terminal RS of the clock pulse generator 16 to a terminal RS' of the counter 10, again determines the number of logic output signals from the analyzers 71 through 7m which indicate a coincidence between the signal pairs connected to the respective analyzer inputs, and transmits a digital signal corresponding to this second count result, via the memory 10a to the input 29 of the comparator 13. After a shift of the sensor signals contained in the shift register 8 by one stage to the left by means of a clock pulse pair $\phi1R$ and $\phi2R$, there follows an additional comparison in the analyzers 71 through 7m and a further serial output of the logical output signals and a third counting of signals representing coincidence of the signal pairs in the counter 10 and another transmission of the count result to the comparator 13. Further readout sequences and count results corresponding to those readout sequences are transmitted to the input 29 of the comparator 13 following alternately effected shifts of the sensor signals in the shift registers 5 and 8 by one stage to the right or to the left respectively.

If the count result which is supplied to the input 29 of the digital comparator 13 via the memory 10a is greater than the digital signal connected at its other input 30, the control inputs of the switches 14 and 121 are supplied with a comparator signal which brings both switches into a conducting state during which the signals connected at their respective inputs are transmitted to their respective outputs. For every clock pulse pair $\phi1L$ and $\phi2L$, or $\phi1R$ and $\phi2R$, respectively effecting a one-stage-shift in the shift registers 5 and 8, a count pulse is derived and supplied to the counter 20. For example, one of the clock pulses such as $\phi1L$ or $\phi1R$ may be employed as such a count pulse. Because the switch 21 is synchronously actuated with the switch 14, the switch 121 always transmits, upon the occurrence of a greater count result at the input 29, the respective count reading of the counter 20 to the memory 122. Thus, after several one stage shifts in each of the shift registers 5 and 8, a count result is stored in the memory 122 which characterizes that information shift between the sensor signals of the shift registers 5 and 8 at which the greatest number of coincidences occurs. In other words, the number of count pulses stored in the memory 22 is a measure of that relative shift of the sensor signals contained in the shift registers 5 and 8 at which a maximum correlation of the sensor signals exists when compared in the analyzers 71 through 7m.

This maximum correlation signal appears at the output 123 of the processing stage A2 and is supplied to an output device 124 which may be a display device which, after a corresponding coding of the digital signal, delivers a digital or analog display of the distance of the object. The output device 124 may alternately consist of an adjustment mechanism of a type known to those skilled in the art, for a photographic or electronic camera which adjusts the distance of a lens which is movable with respect to an image plane so that the object is sharply reproduced on the image plane. A device of this type is described, for example, in the German patent application No. P 28 13 915.3 and in the journal "Electronics" of Nov. 10, 1977 at pages 42–44.

Figure 4:
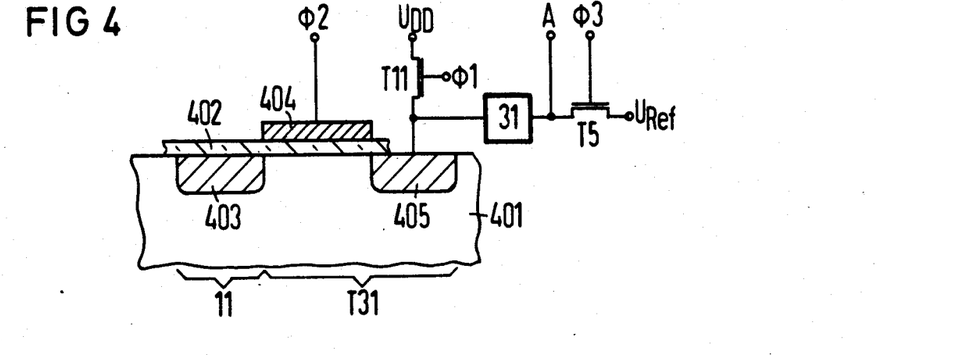
FIG. 4 is a schematic circuit diagram, partly in section, for sensor elements utilizable in the circuit of FIG. 1.
Figure 5:
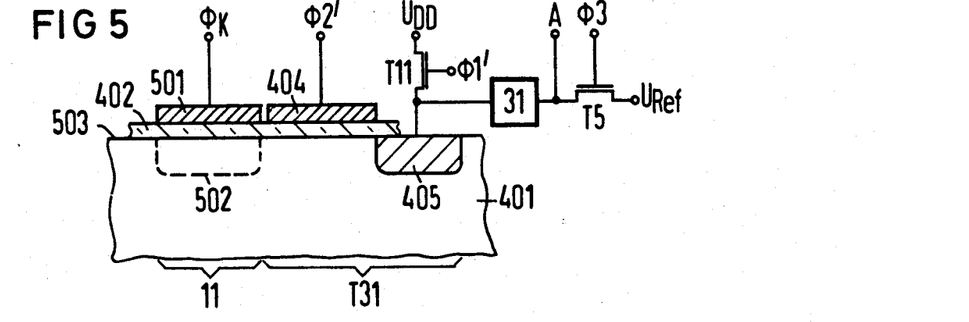
FIG. 5 is a schematic circuit diagram, partly in section, of a second embodiment for sensors utilizable in the circuit of FIG. 1.
Figure 6:
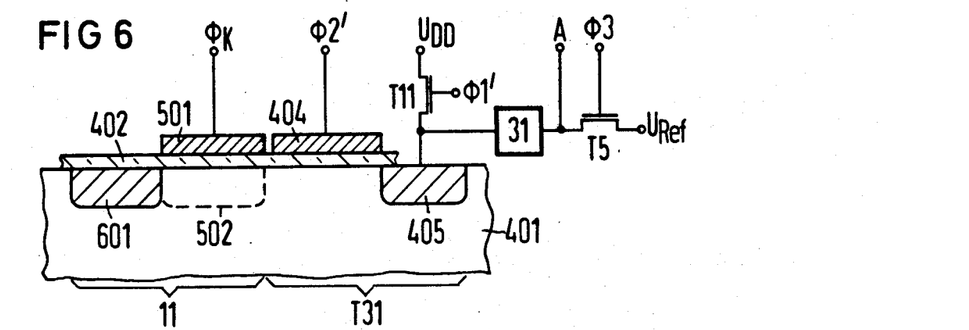
FIG. 6 is a schematic circuit diagram, partly in section, of a third embodiment for sensors utilizable in the circuit of FIG. 1.

FIGS. 4, 5 and 6 depict alternate embodiments of the structure of the sensor elements, such as sensor element 11, in the image sensors. Connection to circuit elements already identified in connection with FIG. 1 is schematically represented in those figures, and those common elements bear identical reference numerals.

As shown in FIG. 4, a thin electrically insulating layer 402 which may, for example, consist of silicon dioxide, is disposed on a doped semiconductor body 401 which may, for example, consist of p-doped silicon. The image sensor 11 is a photodiode which consists of an n-doped semiconductor region 403 in a semiconductor body 401. This region simultaneously forms the source region for the transistor T31. The gate of the transistor T31 is arranged on the insulating layer 402 referenced at 404. The drain region of the transistor T31 is referenced at 405. Via the transistor T11, the oppositely doped region 405 is connected to a terminal which is supplied with the constant voltage $U_{Ref}$ and is also connected to an input of the evaluator 31 at the node 26. The second input of the evaluator 31 is connected as shown in FIG. 2 via the transistor T5 to the reference voltage $U_{Ref}$.

A second embodiment of the sensor elements is shown in FIG. 5 wherein the sensor element 11 consists of a metal-insulator-semiconductor (MIS) capacitor having a gate 501 disposed on the insulating layer 402. The gate 501 may, for example, consist of highly doped polycrystalline silicon and is supplied with a clock pulse voltage $\phi_K$ which results in the generation of a depletion zone 502 in the semiconductor body 401. The further circuit elements of FIG. 5 correspond to those circuit elements in FIG. 4 and are identically referenced. In the circuit of FIG. 5, however, the transistor T11 is supplied with a clock pulse voltage $\phi 1'$ and the transistor T31 is supplied with a clock pulse voltage $\phi 2'$. The simultaneously beginning clock pulses $\phi 1'$, $\phi 2'$ and $\phi_K$ effect a resetting up to the time t1' of the MIS capacitor in the area of the boundary surface 503 of the semiconductor body 401 which approximates the value of the reference voltage $U_{Ref}$. At the time t1', the integration time during which the optically generated charge carriers are collected begins in the MIS capacitor and continues as long as the electrode 501 is supplied with the pulse $\phi_K$. At the end of the pulse $\phi_K$ at a time t2', the end of the integration time is reached. Shortly before this time t2' a new clock pulse $\phi 2'$ is supplied so that a charge transfer, indicated by the arrow 504 in FIG. 3, occurs from the sensor 11 to the region 405 with the charge transfer producing a corresponding change of potential at the input of the evaluator 31. The clock pulse $\phi 1'$ must, as is shown in FIG. 3, be switched off before this charge transfer occurs.

FIG. 6 shows a further embodiment for the sensor elements wherein a photodiode 601 is disposed next to the MIS capacitor formed by the electrode 501, the insulating layer 402 and the zone 502 on the side facing away from the transistor T31. The gate electrode of the transistor T31 is again supplied with the clock pulse voltage $\phi 2'$ and the gate of the transistor T11 is again supplied with a clock voltage $\phi 1'$.

The capacitance of the sensor element 11 shown in FIG. 5 is greater than the capacitance of the sensor element 11 shown in FIG. 4, whereas the capacitance of the sensor element 11 shown in FIG. 6, which is comprised of the photodiode 601 and the MIS capacitor, is greater than that shown in the embodiment of FIG. 5.

Figure 7:
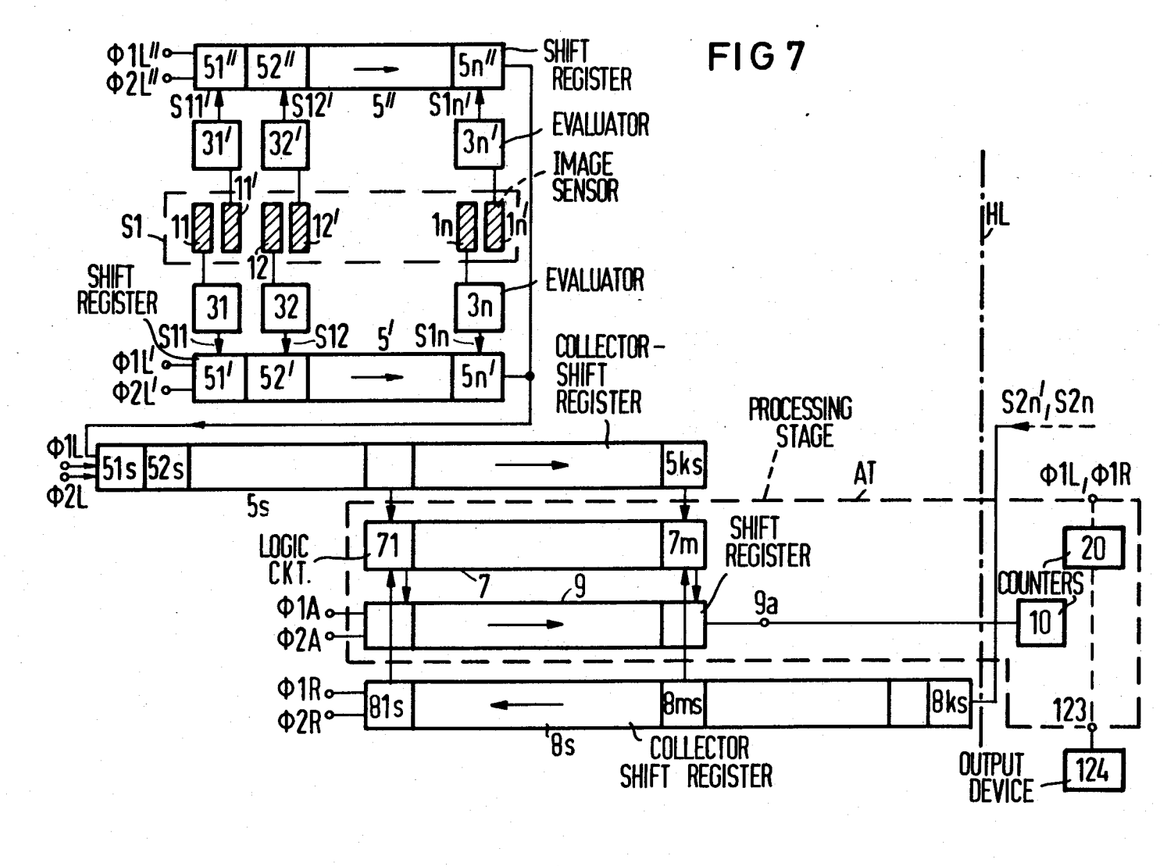
FIG. 7 is a schematic circuit diagram of a second embodiment for a portion of the circuit shown in FIG. 1 for one image sensor.

A second embodiment of the circuit described in FIG. 1 is shown in FIG. 7 for one image sensor S1. It will be understood that an identical arrangement for the sensor S2 is present on the opposite side of the line HL. Only some elements in the processing stage AT are shown in FIG. 7, however, it will be understood that the processing stage of FIG. 7 is intended to be identical to that shown in FIG. 1. As shown in FIG. 7, the individual sensor elements 11 through 1n of the image sensor S1 are narrowly designed in the longitudinal direction such that their narrow dimension corresponds approximately to one half of the dimension in the same direction of the evaluators 31 through 3n. For drawing simplification, it is assumed that the associated switching transistors are included in the blocks representing the evaluators. The outputs of the evaluators 31 through 3n are supplied to the individual input stages 51' through 5n' of a shift register 5' which is supplied with clock pulses $\phi 1L'$ and $\phi 2L'$.

The sensor elements 11 through 1n of the image sensor S1 are complimented by alternating identically dimensioned sensor elements 11' through 1n' respectively connected to evaluators 31' through 3n' having outputs S11' through S1n' transmitted to the individual stages 51'' through 5n'' of a shift register 5'' which is supplied with clock pulse voltages $\phi 1L''$ and $\phi 2L''$. It will be understood that a switching transistor arrangement identical to that shown in greater detail in FIG. 1 is also embodied in each evaluator 31' through 3n'.

The outputs of the stages 5n' and 5n'' of the shift registers are connected to the input of the stage 51s of a collector-shift register 5s, which has a total of k=2n stages. An additional collector-shift register 8s also has k stages. If the shift registers 5' and 5'' are supplied with the clock pulse trains $\phi 1L'$, $\phi 2L'$, $\phi 1L''$ and $\phi 2L''$ in the time interval ZL shown in FIG. 3, the sensor signals $S1n'$, $S1n$, $S1(n-1)'$, $S1(n-1)$ and so forth in this sequence reach the stages 5ks through 51s. In an analogous manner, the sensor signals from the sensor elements 21 through 2n, from FIG. 1, and the signals $S2n'$ from the additional narrow sensor elements in S2, reach the k stages of the shift register 8s. In the embodiment of FIG. 7, the clock pulse voltages $\phi 1R$ and $\phi 2R$ are replaced by the clock pulse voltages $\phi 1R''$, $\phi 2R''$, $\phi 1R'$ and $\phi 2R'$, which respectively correspond to the voltages $\phi 1L''$, $\phi 2L''$, $\phi 1L'$ and $\phi 2L'$. The further operation is completed in an analogous manner as already described in connection with FIG. 1, with the difference being that the number of analyzed sensor signals is twice as great.

Figure 8:
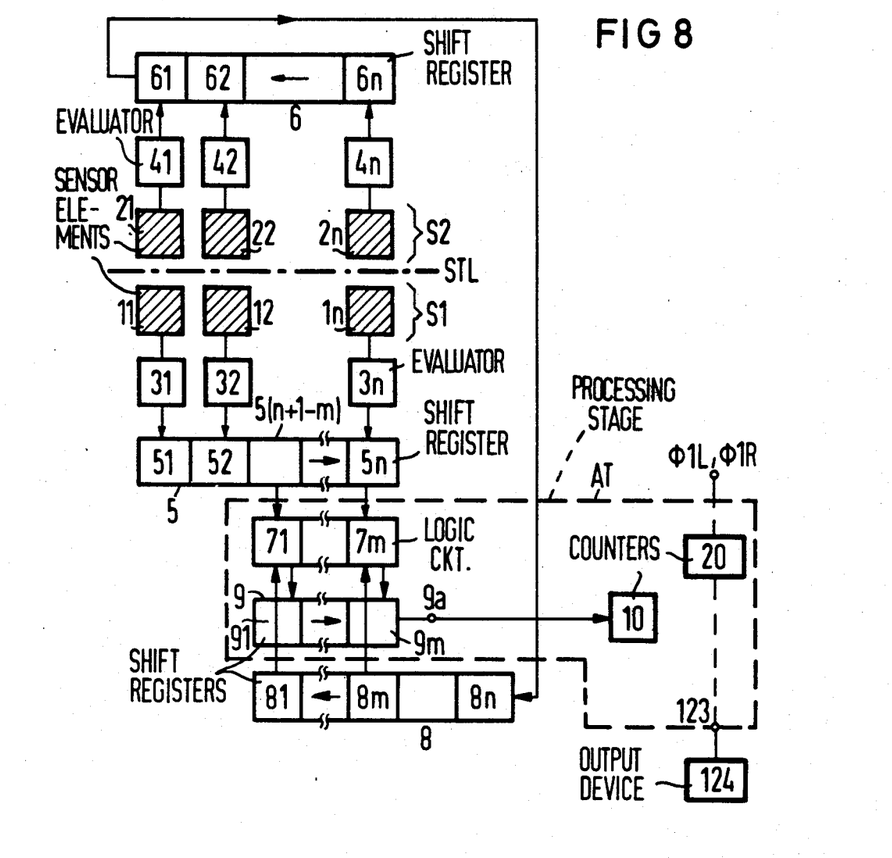
FIG. 8 is a third embodiment of a portion of the circuit shown in FIG. 1 for parallel image sensors.

A further embodiment for a portion of the circuit shown in FIG. 1 is illustrated in FIG. 8 wherein the image sensors S1 and S2 are disposed parallelly adjacent to one another so that the individual sensor elements are in registry. As in FIG. 7, it is assumed that the blocks designating the evaluators 31 through 3n and 41 through 4n include the associated switching transistors shown in greater detail in FIG. 1. The embodiment of FIG. 8 operates identically to the circuit shown in FIG. 1 and may be utilized when the image reproductions of the object are respectively half-projected on the planes of the image sensors S1 and S2 with the upper half of one image falling on that part of the image plane which lies above the line STL, and the lower half of the other image is projected on that part of the image plane below the line STL. The line sections, analyzed by means of the image sensors S1 and S2, are here disposed on the respective boundaries of the image halves which are adjacent to the line STL. Such a type of image projection is also described in the German patent application No. P 28 38 647.2.

As described above, the circuit disclosed herein may be entirely or partially monolithically integrated on a doped semiconductor body which was described above as being p-conductive. The remaining circuit construction may be designed utilizing metal-oxide-semiconductor n-channel technology. The voltages shown, for example, in FIG. 3 have an operational sign showing a positive polarity with respect to the reference potential of the circuit. It will be understood that the inventive concept disclosed herein may be equally as well utilized with an n-conducting semiconductor member and metal-oxide-semiconductor p-channel technology, wherein the voltage operational signs will be reversed.

The circuit areas in the region of the image sensors S1 and S2 may be provided with diaphragms through which exposure of the sensor elements takes place.

Although other modifications and changes may be suggested by those skilled in the art, it is the intention of the inventors to embody within the patent warranted hereon, all changes and modifications as reasonably and properly come within the scope of their contribution to the art.

We claim as our invention:

1. A circuit for sensor-controlled telemetry for use with a post-connected output device for converting signals from said circuit into signals operational for range indication or range adjustment, said circuit comprising:

two linear image sensors each having a plurality of opto-electronic sensor elements for generating charge carriers and a corresponding potential in an amount proportional to radiation incident on said sensor elements,
   corresponding lines of two separately obtained imagings of an object being respectively projected onto said image sensors;
   a group of evaluators associated with each image sensor, each evaluator having a first input connected to a respective sensor element and a second input connected to a reference potential,
   each said evaluator being a comparator switchable at an output between two digital logic states as a function of a comparison of the amount of charge carriers generated by the sensor element connected thereto with said reference potential;
   a plurality of gate-controlled switching transistors interconnected between said sensors and said evaluators for controlling an integration time during which charge carriers are collected in said sensor elements;
   a first shift register having a plurality of stages respectively connected to the outputs of the group of evaluators associated with one of said image sensors, said first shift register having a final group of stages which is less than the total number of stages each having an output;
   a second shift register having a plurality of stages respectively connected through respective switching transistors to the outputs of the group of evaluators associated with the other of said two linear image sensors for serial output of the contents of said stages;
   a select shift register having an input connected to the output of said second shift register for serially receiving the contents of said second shift register, said select shift register having a group of stages which is less than the total number of stages each having an output, said group of stages in said select shift register being equal to said group of stages in said first shift register,
   said first shift register, said second shift register and said select shift register each shifting the information contained therein a pre-determined number of times during a readout cycle of said circuit;
   a processing stage post-connected to said select shift register and said first shift register and having an output connected to said output device, said processing stage including:
   a group of logic analyzers each having a pair of inputs respectively connected to one output from said first shift register and one output from said select shift register, each said logic analyzer generating at an output thereof a logic signal representing coincidence of the inputs supplied thereto,
   a third shift register having a plurality of stages respectively connected to the outputs of said logic analyzers for serial output of said signals representing coincidence, and
   a first counter for counting the number of coincident digital signals from said third shift register after each shift of information in said first shift register, said second shift and said select shift register and determining therefrom a maximum position correlation of said signals from said image sensors, said maximum position correlation appearing at the output of said processing stage for use by said output device and;
   a clock pulse generator for supplying respective clock pulses to said gate controlled switching transistors for permitting transfer of charge carriers from said sensors to said evaluators at the end of said integration time, and to said first, second, third and select shift registers for shifting the contents of the stages thereof.

2. The circuit of claim 1 wherein said first shift register and said select shift register are alternately supplied during a readout cycle with clock pulses for shifting the contents of the respective stages thereof, whereby said shifting is undertaken alternatingly stage-by-stage.

3. The circuit of claim 2 wherein said processing stage further includes:
   a second counter for counting the number of shifts occurring in said first shift register, said second shift register and said select shift register;
   a first memory post-connected to said first counter for storing the contents thereof;
   a digital comparator post-connected at a first input to said first memory and having a control output;

a second memory having an output connected to a second input of said digital comparator;

a first electronic switch interconnected between said first and second memories controlled by said control output of said digital comparator, said digital comparator comparing the contents of said first and second memories and providing a control signal at said control output to close said first electronic switch and transfer the contents of said first memory to said second memory if the count stored in said first memory is greater than the count stored in said second memory;

a second counter which counts the number of shifts occurring in said first and second shift registers;

a third memory having an output connected to said output device; and a second electronic switch interconnected between said second counter and said third memory and having a control input connected to said control output of said digital comparator, said second electronic switch being simultaneously closed with said first electronic switch for transferring the count from said second counter into said third memory.

4. The circuit of claim 1 wherein each sensor element in each image sensor has a longitudinal dimension which is approximately one half of the dimension of an evaluator in the same direction and wherein a plurality of identically dimensioned additional sensor elements are alternatingly disposed between said sensor elements in each image sensor, and wherein said first shift register is a first collector-shift register and wherein said select shift register is a second collector-shift register, further comprising:

an additional group of evaluators respectively post-connected to each additional sensor element for each image sensor;

a fourth shift register interconnected between said group of evaluators for said one image sensor and said first collector-shift register;

a fifth shift register interconnected between said additional group of evaluators for said one image sensor and said collector-shift register, said fourth and fifth shift registers being alternatingly subjected to clock pulses for alternating serial readout thereof into said first collector-shift register;

a sixth shift register interconnected between said group of evaluators for said other image sensor and said second collector-shift register; and a seventh shift register interconnected between said additional group of evaluators for said other image sensor and said second collector-shift register, said sixth and seventh shift registers being supplied with alternating clock pulse voltages for alternating serial readout thereof into said second collector-shift register.

5. The circuit of claim 1 wherein said two image sensors are disposed parallelly along a longest dimension thereof and wherein said groups of evaluators and shift registers associated with each image sensor are disposed on opposite sides thereof.

6. The circuit of claim 1 wherein each evaluator has an input connected to a constant voltage supply through a gate-controlled switching transistor for periodically resetting said evaluator.

7. The circuit of claim 6 wherein each said evaluator is connected to said reference potential through a gate-controlled switching transistor.

8. The circuit of claim 1 wherein each sensor element is a metal-insulator-semiconductor capacitor.

9. The circuit of claim 1 wherein each sensor element is a photodiode.

10. The circuit of claim 1 wherein each sensor element consists of an adjacent metal-insulator-semiconductor capacitor and a photodiode.

* * * * *